(12) United States Patent
Bentell et al.

(10) Patent No.: US 11,995,756 B2
(45) Date of Patent: May 28, 2024

(54) METHODS AND SYSTEMS FOR PROVIDING ANIMATED VISUAL FEEDBACK FOR VOICE COMMANDS

(71) Applicant: Spotify AB, Stockholm (SE)

(72) Inventors: Harry Morgan Bentell, Stockholm (SE); Aaron Paul Harmon, New York, NY (US); Andreas Gustav Christian Pålsson, Stockholm (SE); Karl Humphreys, London (GB); Nicola Felaco, Stockholm (SE); Daniel Bromand, Boston, MA (US)

(73) Assignee: Spotify AB, Stockholm (SE)

( * ) Notice: Subject to any disclaimer, the term of this patent is extended or adjusted under 35 U.S.C. 154(b) by 49 days.

(21) Appl. No.: 17/353,594

(22) Filed: Jun. 21, 2021

(65) Prior Publication Data

US 2021/0407165 A1 Dec. 30, 2021

Related U.S. Application Data

(60) Provisional application No. 63/046,343, filed on Jun. 30, 2020.

(51) Int. Cl.
*G06T 13/80* (2011.01)
*G06F 3/16* (2006.01)

(52) U.S. Cl.
CPC .............. *G06T 13/80* (2013.01); *G06F 3/167* (2013.01)

(58) Field of Classification Search
CPC .............. G06F 3/0481; G06F 3/04842; G06F 3/04845; G06F 3/167; G06F 3/04817; G06T 13/80
See application file for complete search history.

(56) References Cited

U.S. PATENT DOCUMENTS

| | | | | |
|---|---|---|---|---|
| 8,875,041 | B1* | 10/2014 | Desai | G06F 3/04847 715/771 |
| 2014/0207452 | A1* | 7/2014 | Klein | G10L 21/10 704/235 |
| 2015/0053016 | A1* | 2/2015 | Sleator | G01H 9/00 73/655 |

(Continued)

FOREIGN PATENT DOCUMENTS

EP 3089011 A1 11/2016

OTHER PUBLICATIONS

Mathematica ("How to wrap a plot around a circle", published 2014; pp. 1-2) (Year: 2014).*

(Continued)

*Primary Examiner* — Tan H Tran
(74) *Attorney, Agent, or Firm* — Morgan, Lewis & Bockius LLP

(57) ABSTRACT

An electronic device displays a first icon comprising a shape. While displaying the first icon, the device receives a voice command corresponding to a request for media content from the application. In response to, and while receiving, the voice command, the device dynamically animates the first icon, including distorting a radius of a portion of the shape in accordance with a direction of the voice command. The dynamic animation indicates that the electronic device is in a first state. After the voice command is completed, the device displays an indication that the device is in a second state that is distinct from the first state.

21 Claims, 8 Drawing Sheets

Frame 1     Frame 2     Frame 3     Frame 4

Frame 5     Frame 6     Frame 7

(56) References Cited

U.S. PATENT DOCUMENTS

| | | | | |
|---|---|---|---|---|
| 2015/0234564 A1* | 8/2015 | Snibbe | G06T 11/60 | 715/716 |
| 2015/0314454 A1* | 11/2015 | Breazeal | G10L 15/32 | 700/259 |
| 2015/0382047 A1* | 12/2015 | Van Os | G10L 17/22 | 725/38 |
| 2016/0011850 A1* | 1/2016 | Sheen | G06F 3/162 | 715/709 |
| 2016/0234453 A1* | 8/2016 | Han | G06T 13/80 | |
| 2016/0335052 A1 | 11/2016 | Faaborg et al. | | |
| 2017/0230709 A1 | 8/2017 | Vanos et al. | | |
| 2017/0332045 A1* | 11/2017 | Metter | H04L 65/764 | |
| 2018/0284972 A1* | 10/2018 | Akagawa | G06F 3/0481 | |
| 2018/0336275 A1 | 11/2018 | Graham et al. | | |
| 2019/0215397 A1* | 7/2019 | Ekstrand | H04M 1/72469 | |
| 2020/0104018 A1 | 4/2020 | Coffman et al. | | |
| 2020/0211242 A1* | 7/2020 | Reiter | G06T 11/206 | |
| 2021/0142796 A1* | 5/2021 | Saito | G06F 3/067 | |

OTHER PUBLICATIONS

Youtube, https://www.youtube.com/watch?v=A4tqbUcN_Hs, ("AE Exercise: Wave Displaced Circle", published 2015; p. 1) (Year: 2015).*
Anonymous: "Siri Listens /Getting Started with Siri/ InformIT," Mar. 11, 2013, XP055779779, retrieved from the Internet: URL:https://www.informit.com/articles/article.aspx?p=2010878&seqNum=5, retrieved on Feb. 25, 2021, 5 pgs.
Spotify AB, Communication Pursuant to Article 94(3), EP20202382.6, dated Dec. 14, 2021, 9 pgs.
Spotify AB, Extended European Search Report, EP20202382.6, dated Mar. 10, 2021, 11 pgs.
Fossasia, "Full-Screen Speech Input Implementation in SUSI Android App" Aug. 28, 2017 at https://blog.fossasia.org/full-screen-speech-input-implementation-in-susi-android-app/, 9 pgs.
Spotify AB, Decision to Refuse a European Patent Application, EP20202382.6, dated Nov. 11, 2022, 14 pgs.
Spotify AB, Minutes of the Oral Proceedings, Rule 124(4) EPC, EP20202382.6, Oct. 26, 2022, 5 pgs.

* cited by examiner

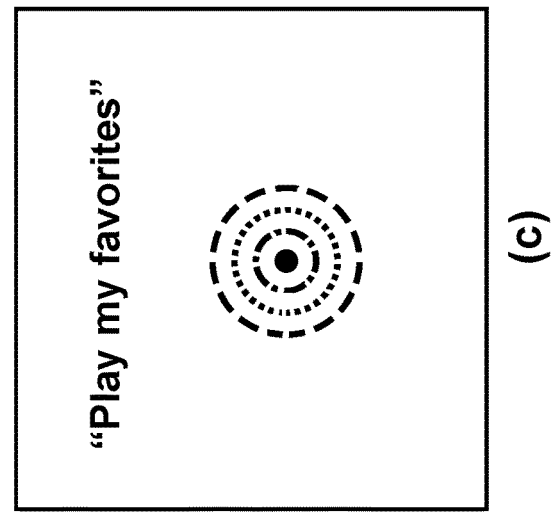
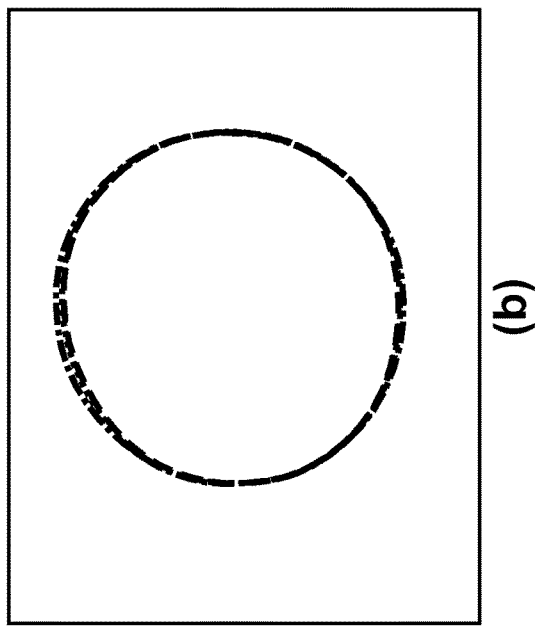
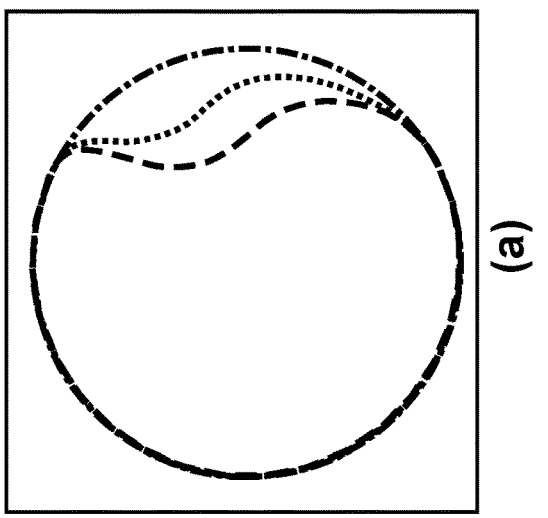
FIG. 2B

300

302 At an electronic device associated with a media-providing service and having one or more processors and memory storing instructions for execution by the one or more processors:

304 Receive a first user input at an application for providing media content executing on the electronic device.

306 In response to the first user input, display, by the application, a first icon comprising a parametrically-defined shape.

308 While displaying the first icon, receive a voice command corresponding to a request for media content from the application.

310 In response to, and while receiving, the voice command, dynamically animate the first icon, including distorting a radius of a portion of the parametrically-defined shape in accordance with a direction of the voice command. The dynamic animation indicates that the electronic device is in a first state.

312 A center of the distorted portion of the parametrically-defined shape corresponds to the direction of the voice command.

314 A center of the distorted portion of the parametrically-defined shape is substantially opposite the direction of the voice command.

316 The distortion of the radius of the portion of the parametrically-defined shape is symmetric about a center of the portion of the parametrically-defined shape.

318 Distorting the radius of the portion of the parametrically-defined shape comprises generating a perturbation of the radius of the portion of the parametrically-defined shape.

310 In response to, and while receiving, the voice command, dynamically animate the first icon, including distorting a radius of a portion of the parametrically-defined shape in accordance with a direction of the voice command. The dynamic animation indicates that the electronic device is in a first state.

(A)

320 Dynamically animating the first icon further include superimposing one or more sinusoidal waves on at least part of the portion of the parametrically-defined shape.

322 The one or more sinusoidal waves comprise a color distinct from a color of the parametrically-defined shape.

324 Distorting the radius of a portion of the parametrically-defined shape creates a wave on the portion of the parametrically-defined shape, the wave having a maximum amplitude at a center of the distorted portion of the parametrically-defined shape.

326 Distorting the radius of the portion of the parametrically-defined shape is in accordance with a volume or frequency of the voice command.

328 Distorting the radius of the portion of the parametrically-defined shape comprises generating a symmetric animation, the symmetric animation including respective ends of the distorted portion that connect with the parametrically-defined shape, the respective ends having smaller amplitude than an amplitude at a center of the distorted portion of the parametrically-defined shape.

330 After the voice command is completed, display an indication that the device is in a second state that is distinct from the first state.

332 The indication that the device is in the second state comprises displaying three concentric parametrically-defined shapes, each parametrically-defined shape having a distinct radius and color.

FIG. 3B

METHODS AND SYSTEMS FOR PROVIDING ANIMATED VISUAL FEEDBACK FOR VOICE COMMANDS

RELATED APPLICATIONS

This application claims priority to U.S. Provisional Application No. 63/046,343, filed Jun. 30, 2020, entitled "Methods and Systems for Providing Animated Visual Feedback for Voice Commands," which is hereby incorporated by reference in its entirety.

TECHNICAL FIELD

The disclosed embodiments relate to providing visual feedback for voice commands.

BACKGROUND

Access to electronic media, such as music and video content, has expanded dramatically over time. As a departure from physical media, media content providers stream media to electronic devices across wireless networks, improving the convenience with which users can digest and experience such content.

SUMMARY

The use of voice commands has become more prevalent as a way of providing instructions to an electronic device. Accordingly, there is a need to provide a user with feedback that their voice commands are being received and processed by the electronic device. To that end, some embodiments of the present disclosure provide a method of providing dynamic visual feedback to a user using an animation. By generating an animation that indicates different states of the electronic device, a user is able to see whether the electronic device is listening, processing, and executing voice commands. This improves the human-machine interface by requiring fewer inputs by the user in order to instruct the device using voice commands. For example, a user is able to see, by the electronic device dynamically updating an animation, whether the electronic device has recognized a wake word and initiated processing of a voice command. Further, by changing the animation in accordance with features of the user input (e.g., a direction, amplitude, or frequency of the voice command), a user can identify whether the electronic device is properly functioning to recognize the user input.

In particular, a method of providing visual feedback to a user that is speaking to a virtual assistant is provided. An electronic device, such as a cell phone or a smart speaker, determines that a user is providing a voice command by receiving a first user input. For example, the electronic device recognizes a "wake word" spoken by the user. After (e.g., or while) receiving the first user input, the electronic device displays visual feedback to the user to convey that the voice assistant is "listening" to the user's command. For example, the first visual feedback appears as a circle. As the user speaks to the electronic device (e.g., provides a voice command), the electronic device updates the displayed visual feedback according to the user's voice. For example, the visual feedback includes warping portions of the circle in a pattern, such as a sine wave in response to the user's speech. The pattern of the sine wave displayed as a portion of the circle changes based on features of the user's voice. For example, the sine wave changes based on a direction (e.g., where the user is located relative to the electronic device), volume and/or frequency of the user's voice command. After the user has completed the voice command, the visual feedback changes again, to a distinct second state, to indicate that the device is "thinking," and retrieving and/or executing the command, if the command was understood.

In accordance with some embodiments, a method is performed at an electronic device (e.g., associated with a media content provider) having one or more processors and memory storing instructions for execution by the one or more processors. The method includes receiving a first user input at an application for providing media content executing on the electronic device. The method further includes, in response to the first user input, displaying, by the application, a first icon comprising a shape. The method includes, while displaying the first icon, receiving a voice command corresponding to a request for media content from the application. The method further includes, in response to, and while receiving, the voice command, dynamically animating the first icon, including distorting a radius of a portion of the shape in accordance with a direction of the voice command, wherein the dynamic animation indicates that the electronic device is in a first state. The method includes, after the voice command is completed, displaying an indication that the device is in a second state that is distinct from the first state.

In accordance with some embodiments, an electronic device (e.g., a server system, a client device, etc.) includes one or more processors and memory storing one or more programs configured to be executed by the one or more processors. The one or more programs include instructions for performing the operations of the method described above. In accordance with some embodiments, a computer-readable storage medium has stored therein instructions that, when executed by an electronic device, cause the server system to perform the operations of the method described above.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 2A-2C illustrate examples of visual feedback in accordance with some embodiments.

FIGS. 3A-3B are flow diagrams illustrating methods for providing animated visual feedback in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first client device could be termed a second client device, and, similarly, a second client device could be termed a first client device, without departing from the scope of the various described embodiments. The first client device and the second client device are both client devices, but they are not the same client device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
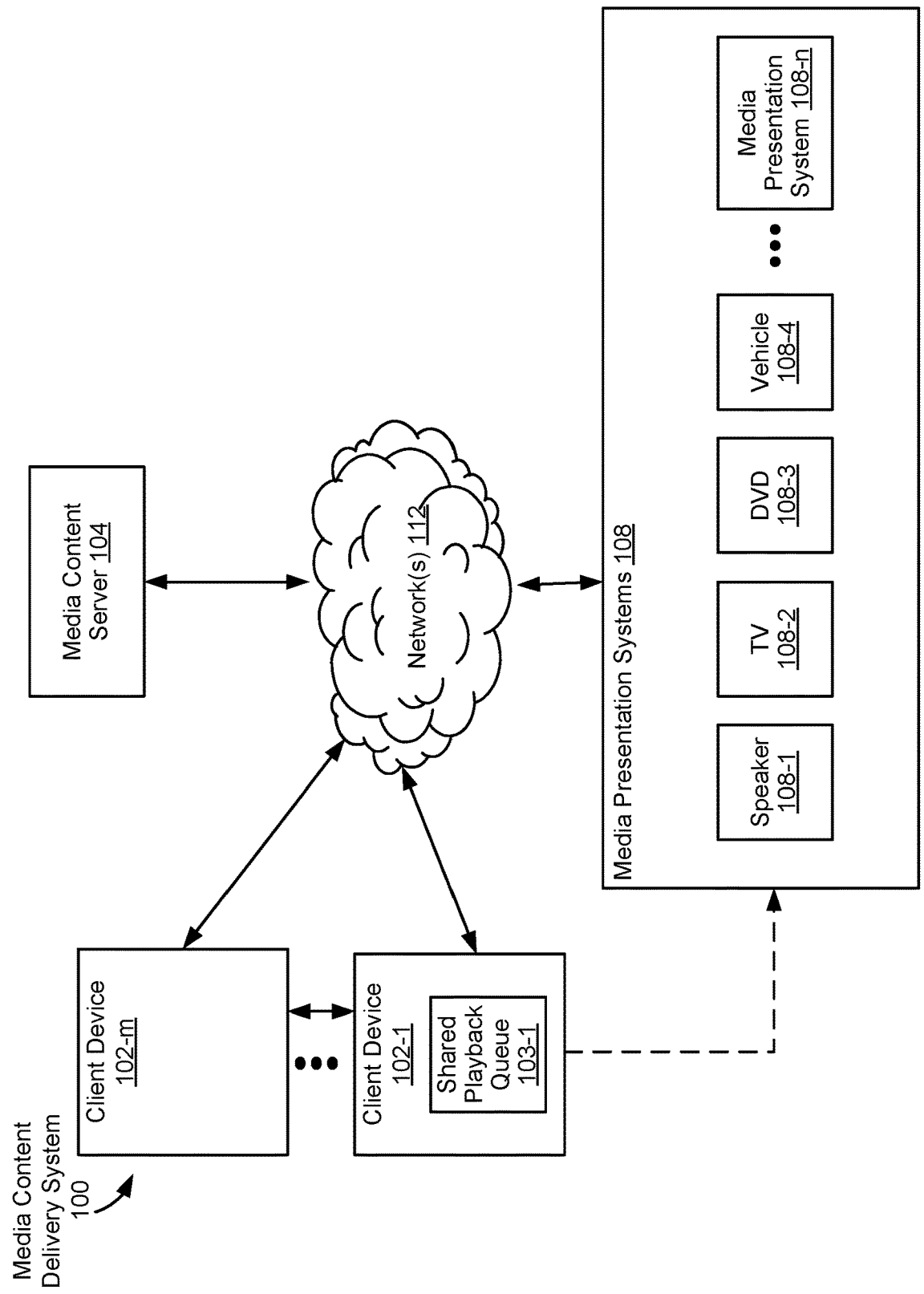
FIG. 1 is a block diagram illustrating a media content delivery system in accordance with some embodiments.

FIG. 1 is a block diagram illustrating a media content delivery system 100 in accordance with some embodiments. The media content delivery system 100 includes one or more client devices 102 (e.g., client device 102-1 to client device 102-m, where m is an integer greater than one), one or more media content servers 104, and one or more media presentation systems 108, including speaker 108-1, television (TV) 108-2, digital versatile disk (DVD) player 108-2, vehicle 108-4, and/or other media presentation system 108-n (where n is an integer greater than four). The one or more media content servers 104 are associated with (e.g., at least partially compose) a media-providing service. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, a client device 102-1 or 102-m is associated with one or more users. In some embodiments, a client device 102 is a personal computer, mobile electronic device, wearable computing device, laptop computer, tablet computer, mobile phone, feature phone, smart phone, digital media player, or any other electronic device capable of presenting media content (e.g., audio and/or video). A client device 102 connects to a media presentation system 108 wirelessly or through a wired connection (e.g., directly through an interface, such as an HDMI interface). In some embodiments, a client device 102 is a headless client. In some embodiments, client devices 102-1 and 102-m are the same type of device (e.g., client device 102-1 and client device 102-m are both mobile devices). Alternatively, client device 102-1 and client device 102-m are different types of devices.

In some embodiments, client devices 102-1 and 102-m send and receive media-control information through the networks 112. For example, client devices 102-1 and 102-m send media control requests (e.g., requests to play music, movies, videos, or other media items, or playlists thereof) to media content server 104 through network(s) 112. In some embodiments, client devices 102-1 and 102-m, receive authentication tokens from the media content server 104 through network(s) 112.

In some embodiments, client device 102-1 communicates directly (e.g., through a wired and/or wireless connection) with client device 102-m. For example, in some embodiments client devices 102 directly communicate playback commands and/or audio code signals between each other (e.g., the media content server 104 may or may not be involved in the exchange). In some embodiments, client device 102-2 communicates directly with client device 102-m. In some embodiments, client device 102-1 communicates directly with media presentation systems 108. As pictured in FIG. 1, client device 102-1 is able to communicate directly (e.g., through a wired and/or wireless connection) with media presentation systems 108, while client device 102-m communicates with the media presentation systems 108 through network(s) 112. In some embodiments, client device 102-1 uses the direct connection with media presentation systems 108 to stream content (e.g., data for media items) for playback on the media presentation systems 108.

In some embodiments, client device 102-1 and client device 102-m each include a media application 422 (FIG. 4) that allows a user of the client device to browse, request (e.g., for playback at the client device 102 and/or a media presentation system 108), and/or present media content (e.g., control playback of music tracks, videos, etc.). Media content may be stored locally (e.g., in memory 412 of the client device 102, FIG. 4) and/or received in a data stream (e.g., from the media content server 104). The media presentation system 108 may be part of the client device 102, such as built-in speakers and/or a display, or may be separate from the client device 102, such as a wirelessly coupled speaker (e.g., speaker 108-1).

In some embodiments, client device 102-1 and client device 102-m each include an instance of shared playback queue 103-1 (e.g., within media application 422). In some embodiments, shared playback queue 103-1 includes a set (e.g., an ordered list, such as a playlist) of media content items provided by the media content server 104. For example, the media content server 104 establishes a shared playback session (e.g., for two or more client devices of two or more users), stores a shared playback queue corresponding to the shared playback session, and/or provides the shared playback queue to the two or more client devices (e.g., client device 102-1 and client device 102-m). In some embodiments, the two or more client devices 120 are enabled to view and/or edit (e.g., add, remove, and/or reorder) content in the shared playback queue. For example, client device 102-1 and client device 102-*m* are each provided with at least a portion of the same shared playback queue 103-1. In some embodiments, the shared playback queue 103-1 includes media content items selected by any combination of client device 102-1, client device 102-*m*, any other client device(s) 102, presentation systems 108, and/or the media content server 104. In some embodiments, the media content items from the shared playback queue are streamed to (e.g., played at and/or provided to) one or more of media presentation systems 108. For example, each client device 102-1 and client device 102-*m* accesses (e.g., views, edits (adds and/or removes media content items from), and/or controls presentation of) the shared playback queue 103-1 while the shared playback queue is presented at one or more of media presentation systems 108. Co-located users are enabled to access the shared playback queue 103-1 on individual devices while streaming media content through media presentation system 108. In some embodiments, the media content items from the shared playback queue are streamed to each of the client devices 102-1 and 102-*m* (e.g., instead of or in addition to media presentation system 108). It is to be understood that the shared playback queue 103-1 is enabled to be shared on additional client devices 102 in addition to client device 102-1 and client device 102-*m*.

In some embodiments, the media content server 104 stores and provides media content (also referred to as media items) (e.g., media content requested by the media application 422 of client device 102-1 and/or 102-*m*, and/or the shared playback queue 103-1) to client devices 102 and/or media presentation systems 108 via the network(s) 112. Content stored and served by the media content server 104, in some embodiments, includes any appropriate content, including audio (e.g., music, spoken word, podcasts, etc.), videos (e.g., short-form videos, music videos, television shows, movies, clips, previews, etc.), text (e.g., articles, blog posts, emails, etc.), images (e.g., photographs, drawings, renderings, etc.), games (e.g., 2- or 3-dimensional graphics-based computer games, etc.), or any combination of content types (e.g., web pages that include any combination of the foregoing types of content or other content not explicitly listed). Audio media items (i.e., audio items) may be referred to as tracks. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

As described above, media presentation systems 108 (e.g., speaker 108-1, TV 108-2, DVD 108-2, Vehicle 108-4, media presentation system 108-*n*) are capable of receiving media content (e.g., from the media content server 104) and presenting the received media content. For example, speaker 108-1 may be a component of a network-connected audio/video system (e.g., a home entertainment system, a radio/alarm clock with a digital display, or an infotainment system of a vehicle). In some embodiments, the media content server 104 sends media content to the media presentation systems 108. For example, media presentation systems 108 include computers, dedicated media players, network-connected stereo and/or speaker systems, network-connected vehicle media systems, network-connected televisions, network-connected DVD players, network-connected vehicles (e.g., vehicle entertainment systems) and universal serial bus (USB) devices used to provide a playback device with network connectivity, and the like.

In some embodiments, a dynamic animation of a first icon is provided. The dynamic animation reflects features (e.g., properties) of a voice command of a user. For example, the dynamic animation changes according to a direction, volume, and/or frequency of the voice command.

Figure 2A:
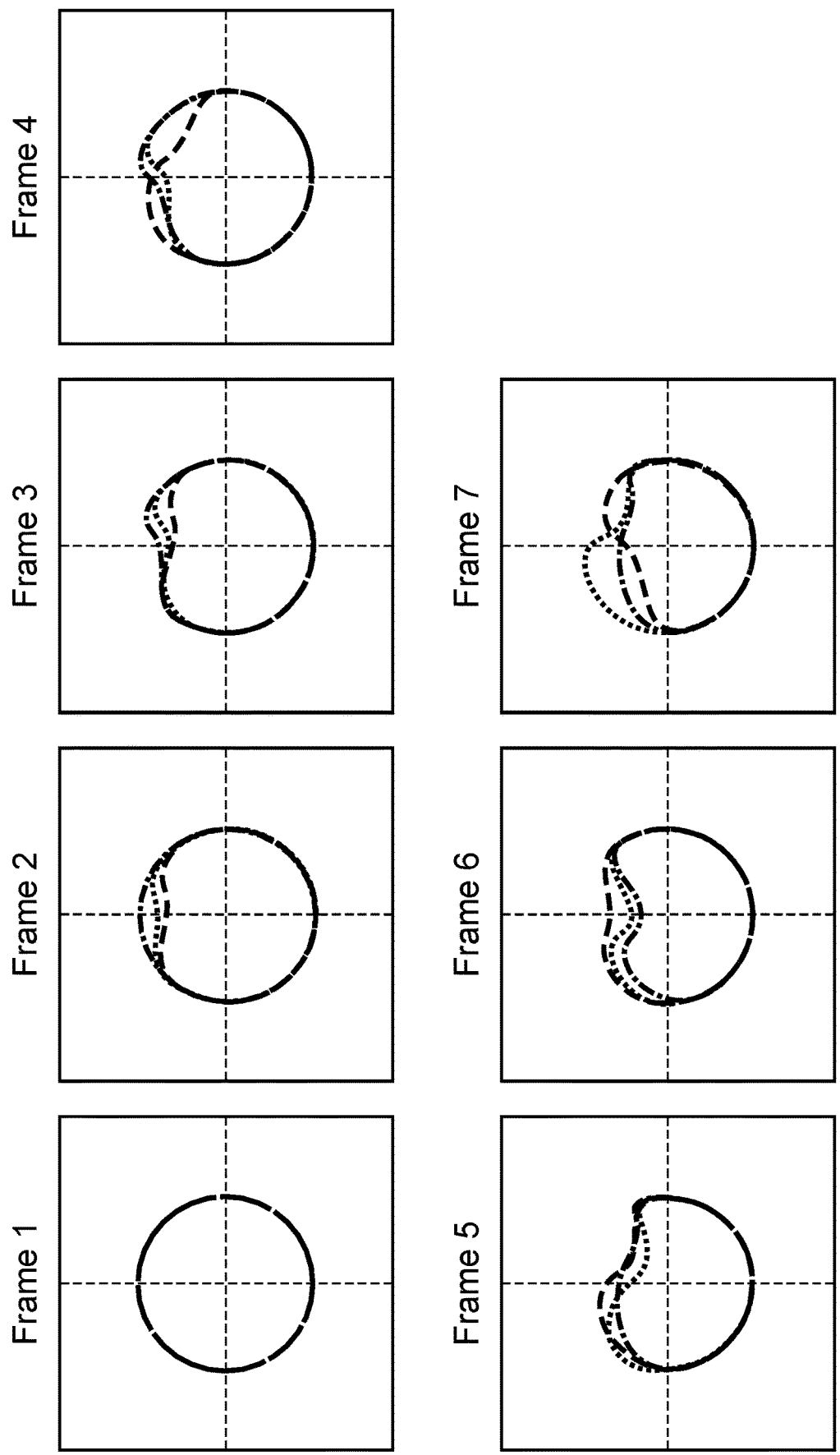

In some embodiments, the first icon is a parametrically-defined shape (e.g., a loop, such as an oval, a circle, an ellipse, or a substantially circular or elliptical shape). In some embodiments, the dynamic animation of a first icon includes warping a radius of the parametrically-defined shape. For example, as illustrated in FIGS. 2A-2B, a circular icon is displayed in each of the frames. In some embodiments, one or more portions of the radius of the circular icon are warped (e.g., changed). In some embodiments, the one or more portions of the radius are changed over time.

In some embodiments, the one or more portions of the radius change in accordance with properties of a voice command that is received by an electronic device. For example, the electronic device (e.g., that displays the icon) determines a direction of the voice command, a volume of the voice command, a frequency of the voice command, and/or additional properties related to the voice command.

More specifically, in some embodiments, the radius of the circular icon is warped by generating a perturbation of the radius of the portion of the shape (e.g., by superimposing a sine wave on to a circle), as described mathematically below. In some embodiments, an amplitude of the sine wave (e.g., an amplitude of the perturbation) is proportional to an amplitude (volume, power level) of the voice command. In some embodiments, the sine wave is attenuated spatially along the circle, with a center of the perturbation (e.g., the location along the arc of the circular icon at which the sine wave is least attenuated) representing the spatial direction at which the voice command is received. In some embodiments, the sine wave is a standing wave such that the perturbation is symmetric about the center of the perturbation. In some embodiments, the sine wave is a moving wave such that the perturbation is generally not symmetric about the center of the perturbation.

For example, the circular icon is updated in accordance with a power of a voice command (or other audio input). An audio input received by a microphone has a decibel level, which is typically a number between −120 and 0 (0 being the loudest). The power is converted to a positive number between 0 and 1 by:

$$p = 10^{\frac{db}{20}}$$

where db is the decibel level (e.g., between −120 and 0).

In some embodiments, in order to animate portions of the circular icon, a sine wave is "wrapped around" the circular icon. Note that, in the example below, the direction of the voice command is assumed to be along the x-axis, moving from negative x values to positive x values. One of skill in the art, however, will appreciate that the choice of the x-axis is arbitrary and represents no loss of generality.

To that end, x and y positions are calculated to represent unperturbed points on the circumference of the circular icon (e.g., a circle). For example, the x position (X) and the y position (Y) for a point on the circumference of a circle are determined using:

$$X = c_x + r \times \cos(\theta)$$
$$Y = c_y + r \times \sin(\theta)$$

where $c_x$ is the x-coordinate at the center of the circular icon, $c_y$ is the y-coordinate at the center of the circular icon, r is the radius of the circular icon, and θ is an angle between the x-axis and a line from the center of the circle ($c_x$, $c_y$) to the unknown point (X, Y) on the circle.

In some embodiments, the x and y positions for each point on the circumference of the circular icon are determined (e.g., using the equations above). For example, where the angle ranges from 0 to 360 degrees, drawing a Bezier Path between each calculated point would result in a perfect circle. However, similar equations could be used to parametrically describe an ellipse or other shape.

In some embodiments, the animation comprises an animated sine wave along a portion (or all) of the circular icon. In some embodiments, calculating the animation of a sine wave along a curved line (e.g., following the shape of the circular icon) changes the typical formula for calculating a sine wave along a straight line of infinite length (e.g., because the circumference of the circular icon is finite in length). Therefore, instead of calculating a y position at time t ($Y_1$(t)), a radius (e.g., a warped radius, as described below) is calculated for time t. Typically, the formula to calculate a y-position of a sine wave at time t is:

$$Y_1(t) = A \sin(\omega t + \phi)$$

where $Y_1$(t) is the value of the sine wave at time t, A is the amplitude of the sine wave, ω is the angular frequency of the sine wave, and ϕ is a constant phase of the sine wave. The sign of the angular frequency ω controls which direction the wave will travel.

Because calculating $Y_1$(t) as explained above assumes that the sine wave is travelling on a line of infinite length, a different formula is provided to calculate the value of the sine wave (e.g., where the y-value of the sine wave corresponds to the warped radius) as the sine wave is wrapped onto a circle of finite length.

In some embodiments, the warped radius of the animation does not exceed a base radius of the circle (e.g., the radius waves 'inwards' relative to the initial radius of the circle, but does not extend outwards, as illustrated in frame (a) of FIG. 2B). In some embodiments, the sine wave is applied over a portion, less than all, of the circle. For example, an attenuation function is used to dampen the sine wave at its start and end, such that the wave will only appear for a portion of the circle. The attenuation function, a(z), activates the sine wave for a certain degree interval, where:

$$a(z) = \left(\frac{k}{k + z^m}\right)^2$$

where k is a constant and m is a constant that may, in some embodiments, be equal to k, and z is a normalized angle:

$$z(\theta) = \frac{\theta - \theta_c}{\Psi}$$

where $\theta_c$ is the angle of the center of the attenuation and Ψ is a scaling factor (e.g., that controls the degree interval, which is the extent of the circle for which the radius is warped). In some embodiments, in addition to attenuating the sine wave on a portion of the circle, a current amplitude scaling factor $A_c$ is also applied to the warped radius. Accordingly, the warped radius, $r_w$, is given by:

$$r_w = r - A_c a(z)(1 - \sin(\omega t + p)).$$

In some embodiments, the amplitude scaling factor $A_c$ is dependent on microphone level (e.g., a larger amplitude for a louder voice command detected at the microphone). In some embodiments, p=$\theta_c$ (e.g., the sine wave is centered at the center of the attenuation). In some embodiments, ω is dependent on microphone level. For example, the sine wave appears to travel faster (e.g., at a higher frequency) for a louder voice command detected at the microphone (e.g., and vice versa). In some embodiments, both the amplitude scaling factor $A_c$ and the angular frequency ω are varied concurrently (e.g., simultaneously) in accordance with a current microphone level. In some embodiments, $\theta_c$ is selected for a portion of the circle corresponding to a position of the input received by the microphone (e.g., a position of a user providing the voice command).

Figure 2C:
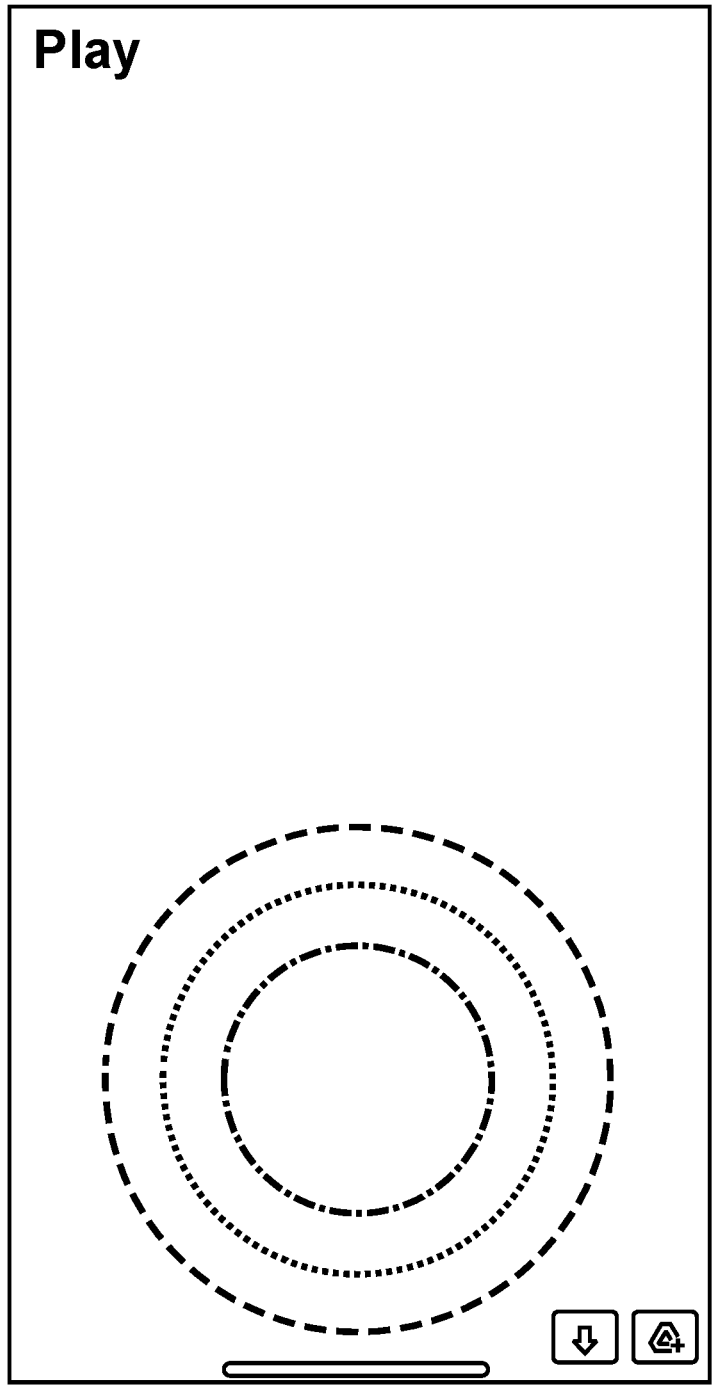

FIGS. 2A-2C illustrate visual feedback responses to a voice command, in accordance with some embodiments. FIG. 2A illustrates an animation over time of a first icon that includes one or more shapes (e.g., the animation shown as frames progress from frame 1 to frame 7). In some embodiments, the portion of the first icon that is animated corresponds to a direction that a voice command is received. For example, the electronic device determines that a voice command is received in the forward direction, and therefore the top portion of the icon, as shown in FIG. 2A, is animated. FIG. 2A illustrates that in some embodiments, the animation of the first icon comprises a plurality of shapes. For example, FIG. 2A shows multiple animated loops, each of which is a parametrically-defined shape. In the first image (frame 1), the three loops (e.g., circles) completely overlap to appear as if there is only a single loop.

In some embodiments, the icon of frame 1 is displayed in response to receiving an input from a user. For example, in response to receiving a wake word, the icon is displayed. In some embodiments, a wake word (e.g., "Hey Spotify") is a word that initiates a voice command processing system (e.g., where a wake word is followed by a voice command). In some embodiments, the icon of frame 1 is displayed without a specific input (e.g., the icon is part of a user interface that is displayed prior to or without utterance of a wake word). For example, the icon is displayed whenever a first user interface is invoked. In some embodiments, the icon of frame 1 is displayed upon initiation of a voice command mode (e.g., the user interface is updated from a main playback interface to an interface that displays the icon). It will be understood that the icon of frame 1 can be displayed on a plurality of presentation devices (media presentation system 108), as described above with respect to FIG. 1. For example, the icon is displayed on an entertainment system of a vehicle 108-4. In some embodiments, the icon is displayed on a display of a client device 102-1 (e.g., a mobile phone).

In some embodiments, each shape of the plurality of shapes of the first icon (e.g., each loop of the three loops) corresponds to a different speaker. For example, two or more users provide voice commands to the media presentation system 108, and a loop is assigned to each user such that in accordance with the respective user providing a voice command, the respective loop assigned to the respective user is animated in accordance with the voice command. For example, the media presentation system 108 identifies a respective speaker for a respective voice command and animates the loop that corresponds to the identified speaker (e.g., by modifying a radius of at least a portion of the loop that corresponds to the identified speaker).

In some embodiments, each speaker is associated with a distinct color (e.g., each color corresponds to a line pattern in FIG. 2A). For example, each of the distinct shapes (e.g., each loop) has a distinct color, wherein each shape and color represent a distinct speaker. In some embodiments, the colors correspond to distinct speakers such that even when the shapes overlap (e.g., appear as if there is only a single loop), in response to a voice command by a first speaker, the shape having a first color associated with the first speaker is animated (e.g., to at least partially not overlap with the other shapes).

In some embodiments, the icon includes a number of shapes of the plurality of shapes that is based on a number of identified users (e.g., speakers). For example, as the media presentation system 108 detects additional speakers (e.g., distinct from previously detected speakers), additional shapes (e.g., loops) are added to the icon such that each shape corresponds to a distinct speaker (e.g., user). For example, in response to detecting a fourth speaker (e.g., user), an additional loop is added to the icon to display four loops. In some embodiments, the fourth loop has a different color than the other three loops.

In some embodiments, a portion of the shape (e.g., icon) is changed (e.g., the radius of the loop is altered) in accordance with a direction of the current speaker. For example, if two users speak at the same time, the device animates two of the loops (each loop corresponding to a speaker) at different portions of the shape, in accordance with the respective locations of the speakers (e.g., where the speakers are located at different positions relative to the device). In some embodiments, in accordance with a determination that two users are speaking at the same time, a same portion of the shape is animated (e.g., wherein the portion of the shape is selected as a point between the two speakers).

In some embodiments, an amount of distortion (e.g., an amplitude of the sine wave that alters the radius of the portion of the icon) is based on a volume level of the speaker (e.g., how loud and/or close the speaker is, as detected by the device).

In some embodiments, the icon of frame 1 illustrated in FIG. 2A is animated in order to convey states of the electronic device. For example, in response to receiving a wake word from a user, frame 1 is displayed to indicate a "listening" state that corresponds to the device awaiting a voice command following the wake word. Frame 1 is then animated to display frame 2 in response to receiving a voice command to indicate that the electronic device is listening to the voice command.

In some embodiments, in response to receiving a voice command (e.g., after receiving a wake word), during the "listening state," the icon illustrated in frame 1 is warped to produce the icon in frame 2. The animation progresses, over time, as shown from frame 1 to frame 7. It will be understood that, in some embodiments, the transparency of one or more of the three loops is changed during the animation. In some embodiments, each of the loops is displayed with a distinct transparency level (e.g., the loops share a same color, but are displayed with different transparencies). In some embodiments, the transparency and/or the color of each loop in the plurality of loops is distinct from the other loops in the plurality of loops. In some embodiments, the animation comprises more or less than three loops (e.g., two loops, four loops, etc.).

In some embodiments, as the animation progresses, the portion of the loops that is warped increases (e.g., the attenuation increases according to the equation described above). For example, it appears that a larger portion of the circle is warped as the animation progresses from frame 1 to frame 7. As illustrated in FIG. 2A, in frame 7, it appears that the warped portion is nearly half of the loops, whereas in frame 1, only about a quarter of the loops appears warped (e.g., the top quarter).

In some embodiments, within each frame, the plurality of loops are warped according to different factors. For example, the predefined constants (as explained above) are varied among the different loops. This provides for the animation to appear as three distinct waves (e.g., sine waves) on the portions of the respective loops. For example, each sine wave is damped differently, or has a different phase, such that they do not completely overlap. In some embodiments, the portions of the icon that are not animated remain in the shape of the un-warped loops. For example, the bottom portion of each loop, through the animation illustrated in FIG. 2A, maintains a constant (e.g., un-warped) radius. In some embodiments, each loop comprises distinct colors (e.g., and/or transparencies), as indicated by the distinct line patterns for each loop shown in FIG. 2A.

In some embodiments, the icons illustrated in frames 1 through 7 are animated around the loops. For example, while FIG. 2A only illustrates the warped portion at the top of the loops, in some embodiments, the warped portion is on a side and/or bottom portion of the loops, as illustrated in (a) of FIG. 2B, which illustrates the warped portion on the right side of the loops. In some embodiments, the portion of the warped radius changes over time (e.g., in accordance with movement of the voice command). For example, as a user inputs a voice command, if the user moves locations relative to the electronic device that is displaying the animation, the warped portion of the loops follows the user (e.g., by moving/traveling around the loops).

In some embodiments, the icons illustrated in frames 1 through 7 are warped in accordance with features of a voice command (e.g., or other audio input). For example, as explained in the equations above, a louder (e.g., higher decibel) voice command results in a larger amplitude of the wave created within the warped portion of the lops. In some embodiments, as the volume (e.g., decibel level) of the voice command changes, the animation is dynamically updated in accordance with a current volume.

In some embodiments, the icon is animated in accordance with an audio output from the electronic device. For example, the electronic device outputs a response to a voice command and/or media content items, and the animation is updated in accordance with the features of the audio output.

FIG. 2B illustrates another example of an icon, shown in frame (a) of FIG. 2B, that is displayed in response to receiving an input (e.g., voice command) from a user. For example, the icon illustrated in frame (a) of FIG. 2B illustrates a different portion of the loops being animated (e.g., a side portion as opposed to top portions shown in the animations of FIG. 2A). In some embodiments, as illustrated in frame (a) of FIG. 2B, the animation comprises altering a shape of the loop inward without altering any of the shapes of the loops outward (e.g., the radius does not extend beyond the radius of the original (outer) loop). It will be understood that the example of the icon illustrated in frame (a) of FIG. 2B may be animated in a similar way to the icon animation illustrated in frames 1-7 in FIG. 2A. For example, an animation of frame (a) of FIG. 2B comprises varying the radii (e.g., the warped radii) for the three loops such that each of the loops has a sine wave extending inwards. In some embodiments, as each of the shapes in the icon are warped, the warped portions of the shapes do not overlap with the warped portions of the other shapes in the icon (e.g., frame (a) of FIG. 2B illustrates there is no cross-over between the warped radii of the loops, whereas frame 4 of FIG. 2A illustrates the warped portion of the loops cross over each other).

In some embodiments, in response to detecting an end of the voice command, the animation returns to its initial state (e.g., goes back to its beginning state of frame 1). In some embodiments, in response to detecting an end of the voice command, instead of going back to frame 1, the electronic device animates the icon as shown in frame (b) of FIG. 2B (e.g., displays a second animation distinct from the animation that is displayed while the voice command is received).

In some embodiments, the icon shown in frame (b) of FIG. 2B indicates that the device is in a second state, such as a "processing" state (also referred to herein as a thinking state), distinct from the listening state corresponding to the first animation described in FIG. 2A. In some embodiments, the device enters the processing state after the voice command has been detected, and the processing state indicates that the electronic device is processing the voice command to determine an instruction (e.g., a playback command). For example, the voice command corresponds to a request for a media content item, and the device displays the icon shown in frame (b) in FIG. 2B while processing this voice command and retrieving the media content item for playback. In some embodiments, the icon indicating the processing state ceases to be displayed in accordance with a determination that the voice command has been recognized (and/or that the device is ready to provide the results of the voice command, such as by playing back requested media content).

In some embodiments, as illustrated in frame (b) of FIG. 2B, a top portion, a side portion, and a bottom portion of the loops are animated during the "processing" state by warping the radius of at least one loop of the plurality of loops (e.g., that are stacked or layered, as described above). For example, while the animation appears less warped in frame (b) of FIG. 2B (e.g., as compared to the warped animation of frame (a) of FIG. 2B), it is possible to see the loop behind the top loop of the icon (e.g., unlike frame 1 in FIG. 2A). In some embodiments, the animation of frame (b) of FIG. 2B is the starting point of the animation sequence illustrated in FIG. 2A. For example, instead of frame 1 having a completely un-warped loop, frame 1 has a slightly warped loop in a plurality of directions along the circumference.

In some embodiments, after processing the voice command (e.g., and animating the icon as shown in (b) of FIG. 2B), the device enters another state (e.g., a confirmation state illustrated in frame (c) of FIG. 2B or a command failed state, explained below) in which it provides a result of its processing. For example, in some embodiments, the device successfully processes the voice command, and the state changes to a confirmation state (e.g., a result state) for providing the requested media content item (e.g., or executing the instructions requested by the voice command). In some circumstances, the device is unable to process and/or retrieve the requested content (e.g., or action) from the voice command, and the device enters a command failed state (e.g., an error state). In some embodiments, situations such as no internet connection, too noisy of an environment, an overheated device, no further play intent commands detected after detection of a wake word, etc., cause the device to enter the command failed state.

In some embodiments, the icon for the command failed state comprises three loops in a concentric arrangement (e.g., by varying the radii of the loops) (e.g., similar to the icon shown in (c) of FIG. 2B, displayed with no text or text indicating the command failed (e.g., "Try Again")). In some embodiments, the command failed state is also indicated by changing the color and/or transparency of the loops. In some embodiments, no animation of the icon is provided to indicate the command failed state. In some embodiments, in accordance with the device entering the command failed state, the device redisplays frame 1 as shown in FIG. 2A (e.g., where only one circle is displayed and not animated until another voice command is detected). In some embodiments, an audible error message (or other audio notification) is played by the device (e.g., media presentation system 108) to indicate the command failed state. In some embodiments, the audible error message is played while concurrently displaying frame 1 of FIG. 2A (e.g., or without displaying frame 1 of FIG. 2A) to indicate the command failed state. In some embodiments, in accordance with the device entering the command failed state, the device displays a user interface for content selection (e.g., a main playback interface that includes selectable content and/or recommendations of content for the user). For example, the main playback interface includes one or more user-selectable options for initiating playback of one or more playlists.

FIG. 2B further illustrates the animation progressing to a confirmation state at frame (c). For example, after a voice command (e.g., or other user input) is successfully processed (e.g., and the icon is animated, for example, from frame 1 to frame 7 in FIG. 2A and/or the device has completed "thinking" while displaying the animation illustrated in frame (b) of FIG. 2B), the media presentation system 108 is ready to play a media item that was requested by the user (e.g., and enters the confirmation state). In some embodiments, the icon for the confirmation state is displayed in response to the device successfully determining a command (e.g., a playback command) from the received user input. For example, if the device does not successfully determine a command from the received user input, the device enters the command failed state (described above) instead of the confirmation state.

In some embodiments, the icon for the confirmation state illustrated in frame (c) of FIG. 2B is displayed before playing back the media item and/or is displayed while beginning playback of the media item. In some embodiments, the icon illustrated in frame (c) of FIG. 2B is displayed for a first predefined amount of time (e.g., 1 second, 2 seconds, 5 seconds, 10 seconds, etc.) (e.g., before initiating playback or during playback of the media item). In some embodiments, after the confirmation icon illustrated in frame (c) of FIG. 2B is displayed for the predefined amount of time, the device updates the display to return to a playback view (e.g., a user interface that displays content that is currently played back at the device).

In some embodiments, the icon illustrated in frame (c) of FIG. 2B includes a plurality of loops (e.g., three loops), wherein each loop is a distinct color (e.g., as indicated by the distinct line patterns). In some embodiments, the plurality of loops are stacked (e.g., as concentric loops) with varied radii (e.g., without warped portions of the radii). In some embodiments, as described above, the distinct colors represent distinct speakers that have been identified. In some embodiments, all of the loops (e.g., circles) illustrated in frame (c) of FIG. 2B are displayed with a same color (e.g., where the color is selected to represent the respective user that provided the respective voice command that has been processed). For example, the speaker that instructed the device to "Play my favorites" is associated with a first color, and the three concentric loops illustrated in frame (c) of FIG. 2B are each displayed as having the first color. In some embodiments, the concentric loops share a same color but are displayed with varied transparencies.

In some embodiments, the transition from the icon illustrated in frame (b) of FIG. 2B to the icon illustrated in frame (c) of FIG. 2B is an animated transition. For example, the radii of the three loops in frame (b) are contracted towards the center of the loops, into smaller radii as shown in frame (c) of FIG. 2B. In some embodiments, the animated transition from frame (b) to frame (c) of FIG. 2B comprises increasing the radii of the three loops around a shared center point (e.g., the loops are concentric). In some embodiments, the animated transition mimics a nod or an eye blink, such that the user understands his/her commands are confirmed.

FIG. 2C illustrates an icon that includes three concentric circles, in accordance with some embodiments. In some embodiments, the icon displayed in FIG. 2C is an alternative animation to the icon animations described with reference to FIGS. 2A-2B. For example, in some embodiments, instead of animating the icon to warp a portion of the radius of one or more loops (e.g., circles), the animation of the icon comprises one or more loops of different radii that are dynamically updated to expand (e.g., and/or contract) in size. In some embodiments, the radii of the different loops expand (e.g., and/or contract) proportionally (e.g., all of the loops increase and/or decrease in size together at a same rate) to maintain a fixed distance (e.g., or to vary the distance (e.g., proportionally)) between the loops. For example, the loops are animated to change size according to a same scaling factor. In some embodiments, each circle of the three concentric circles illustrated in FIG. 2C comprises a distinct color (e.g., each color is indicated by a different line pattern). In some embodiments, the radius of each circle (e.g., the radii of all circles) changes (e.g., gets longer or shorter) based on changes in a received volume level. For example, the radii of the circles increase as volume increases (e.g., the radii change proportionally to the change in volume), and the radii of the circles decrease as volume decreases (e.g., or vice versa, where an increase of volume causes a decrease in the radii of the circles).

In some embodiments, a maximum radius length is predefined such that the animation view is contained appropriately within a predefined bottom portion of the display (e.g., within the bottom half or bottom third of the display). In some embodiments, the device displays text that corresponds to a recognized voice command concurrently with display of the icon. For example, the device displays "Play" (e.g., where the voice command is play). In some embodiments, the text is displayed in a distinct portion of the user interface than the icon (e.g., the text is displayed at the top of the user interface, while the icon is displayed in the bottom third of the user interface).

FIGS. 3A-3B are flow diagrams illustrating a method 300 for providing animated visual feedback to a user, in accordance with some embodiments. Method 300 may be performed (302) at an electronic device (e.g., media content server 104, FIGS. 1 and 5; client device 102, FIGS. 1 and 4) having one or more processors and memory storing instructions for execution by the one or more processors. In some embodiments, the electronic device is associated with a media-providing service (e.g., provides media content for playback to client devices 102 and/or media presentation systems 108 in a media content delivery system 100, and/or executes an application for the media-providing service). In some embodiments, the method 300 is performed by executing instructions stored in the memory of a server system (e.g., in memory 506, FIG. 5) or client device (e.g., in memory 412, FIG. 4). In some embodiments, the method 300 is performed by a combination of the server system and a client device.

Referring now to FIG. 3A, in performing the method 300, the electronic device receives (304) a first user input at an application for providing media content executing on the electronic device. In some embodiments, the first user input comprises a voice input (e.g., a wake word). In some embodiments, the first user input comprises a touch input (e.g., at a client device associated with the user). In some embodiments, the first user input comprises a user input that causes the electronic device to wait for a second input (e.g., the voice input). For example, the first user input notifies the electronic device to monitor (e.g., wait) for a voice command.

In response to the first user input, the electronic device displays (306), by the application, a first icon comprising a shape. For example, in some embodiments, the icon illustrated in (b) of FIG. 2B is initially displayed. In some embodiments, the first icon comprises frame 1 illustrated in FIG. 2A. In some embodiments, the first icon comprises a circle with a predefined radius. In some embodiments, the first icon comprises a plurality of circles (e.g., that at least partially overlap).

While displaying the first icon, the electronic device receives (308) a voice command corresponding to a request for media content from the application. For example, the electronic device receives a voice command that corresponds to a playback command for media content. For example, the voice command is a command to start, stop, or pause playback of a media content item (e.g., "play Artist A").

In response to, and while receiving, the voice command, the electronic device dynamically animates (310) the first icon, including distorting a radius of a portion of the shape in accordance with a direction of the voice command. The dynamic animation indicates that the electronic device is in a first state (e.g., a "listening" state). For example, the electronic device dynamically animates the first icon according to the animations described with reference to FIG. 2A.

In some embodiments, a center of the distorted portion of the shape corresponds to (312) the direction of the voice command. For example, the electronic device determines a direction of the voice command (e.g., relative to a position of a playback device, such as media presentation system 108 and/or relative to the electronic device). The electronic device selects the portion of the animation to distort in accordance with the determined direction of the voice command. For example, a user (e.g., and the user's voice command) that is positioned to the right of the media presentation system would cause the electronic device to distort a radius of a portion of the shape that is on the right side of the loops. It will be understood that the directionality of the voice command can be identified by a degree around the media presentation system (e.g., out of the 360 degrees surrounding the media presentation system).

In some embodiments, a center of the distorted portion of the shape is (314) substantially opposite the direction of the voice command. For example, a user that is positioned to the left of the media presentation system would cause the electronic device to distort a radius of a portion of the shape that is on the right side of the shape (e.g., between degrees 0 and 180, where degree 0 is defined as the "top" of the display).

In some embodiments, the distortion of the radius of the portion of the shape is symmetric (316) about a center of the portion of the shape. For example, the center of the portion of the shape includes a same (e.g., mirrored) distortion of the radius along the portion relative to a center axis of the portion.

In some embodiments, distorting the radius of the portion of the shape comprises (318) generating a perturbation of the radius of the portion of the shape. For example, the shape does not have a smooth edge all the way around the shape. The portion of the shape appears to move away from the typical path of the shape circumference (e.g., by creating one or more waves at the portion of the shape).

In some embodiments, dynamically animating the first icon further includes (320) superimposing one or more sinusoidal waves on at least the portion of the shape. For example, it appears that a sinusoidal wave is wrapped around a portion of the shape. In some embodiments, the sinusoidal wave varies over time, such that the animation appears as a non-stationary (e.g., traveling) sinusoidal wave. In some embodiments, the sinusoidal wave only waves inwards relative to the shape (e.g., the sinusoidal wave does not extend beyond the boundaries of the shape). In some embodiments, the sinusoidal wave is damped. In some embodiments, a degree of damping changes over time (e.g., the amount of damping is increased and/or decreased over time). In some embodiments, the damping occurs while the sinusoidal wave travels (e.g., along the portion of the shape). In some embodiments, each sinusoidal wave is damped a different amount and/or travels at a different speed.

In some embodiments, the one or more sinusoidal waves comprise (322) a color distinct from a color of the shape. For example, the shape maintains a first color, and the portion of the shape (e.g., the one or more sinusoidal waves) is displayed with a second color. In some embodiments, each of the one or more sinusoidal waves is displayed as a different color. It will be understood that a different color can be a same base color of a different shade, transparency, or other pattern.

In some embodiments, distorting the radius of a portion of the shape creates (324) a wave on the portion of the shape, the wave having a maximum amplitude at a center of the distorted portion of the shape. In some embodiments, the maximum amplitude of the wave at the center is changed in accordance with a volume (decibel) level of the voice command. For example, as a user gets louder (e.g., by raising the volume of their voice and/or by getting closer to the media presentation system), the maximum amplitude of the wave increases with the increase in volume of the voice command. In some embodiments, the maximum amplitude of the wave decreases with an increase in volume of the voice command. In some embodiments, the maximum amplitude of the wave is determined according a decibel level, as explained above.

In some embodiments, distorting the radius of the portion of the shape is (326) in accordance with a volume or frequency of the voice command. For example, a larger volume of the voice command causes more distortion (e.g., larger change in the radius of the portion of the shape). In some embodiments, the distortion is dynamically updated according to a change in volume or frequency of the voice command while receiving the voice command. In some embodiments, the distortion is determined based on the features of the voice command within a first predefined amount of time of the voice command (e.g., the first 3 seconds of initiating the voice command).

In some embodiments, distorting the radius of the portion of the shape comprises (328) generating a symmetric animation, the symmetric animation including respective ends of the distorted portion that connect with the shape (e.g., the second portion of the shape with a radius that has not been distorted), the respective ends having smaller amplitude than an amplitude at a center of the distorted portion of the shape.

After the voice command is completed, the electronic device displays (330) an indication that the device is in a second state that is distinct from the first state. For example, the indication that the device is in the second state is a modified version of the first icon. In some embodiments, the second state comprises a processing or "thinking" state of the electronic device. In some embodiments, the "thinking" state is illustrated in frame (b) of FIG. 2B. For example, after receiving the voice command, the electronic device determines the playback command requested by the voice command. In some embodiments, the electronic device cannot determine the playback command that is requested by the voice command.

In some embodiments, after completion of the second state (e.g., the "thinking" state), the device enters a third state. In some embodiments, the third state comprises a result state (e.g., a confirmation state), as described with reference to frame (c) of FIG. 2B. For example, in accordance with a determination that the electronic device determines the playback command associated with the voice command, the electronic device displays the playback command (e.g., a textual description of the playback command and/or by executing the playback command). For example, in response to the device determining that the voice command "play playlist XYZ" corresponds to a playback command to begin presenting playlist XYZ, the indication that the device is in a second state comprises displaying playlist XYZ (or a portion of playlist XYZ, such as a media content item within playlist XYZ). In some embodiments, the device enters the third state without going through the second state (e.g., the device directly updates from the first state to the third state).

In some embodiments, in accordance with a determination that the voice command is not recognized (e.g., the playback command cannot be determined), the electronic device provides an indication of a fourth state that corresponds to an error state (e.g., a "result not found" state). In some embodiments, no animation is displayed for the error state. In some embodiments, the error state comprises updated a color of the icon to indicate an error. For example, the electronic device modifies the first icon to display the shape in a different color than the shape displayed after receiving the first user input. In some embodiments, the error state is a fourth state, distinct from the third state, that the device enters after completion of the second state (e.g., after completion of the "thinking" state). For example, in some embodiments, the device directly updates from the first state to the fourth state (e.g., the error state) without going through the second state (e.g., the "thinking" state).

In some embodiments, the indication that the device is in the second state comprises (332) displaying three concentric shapes, each shape having a distinct radius and color. In some embodiments, the second state comprises displaying overlapping (e.g., layered) shapes, that, when aligned (e.g., with the same radii) appear as a single loop. For example, the icon illustrated in (b) of FIG. 2B illustrates a plurality of shapes (e.g., layered/overlapping shapes), wherein portions of the radii of the shapes are warped such that some of the shapes that are layered behind a first shape are partially visible. In some embodiments, the three concentric shapes indicate that the electronic device did not determine a playback command corresponding to the received voice command.

Although FIGS. 3A-3B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Figure 4:
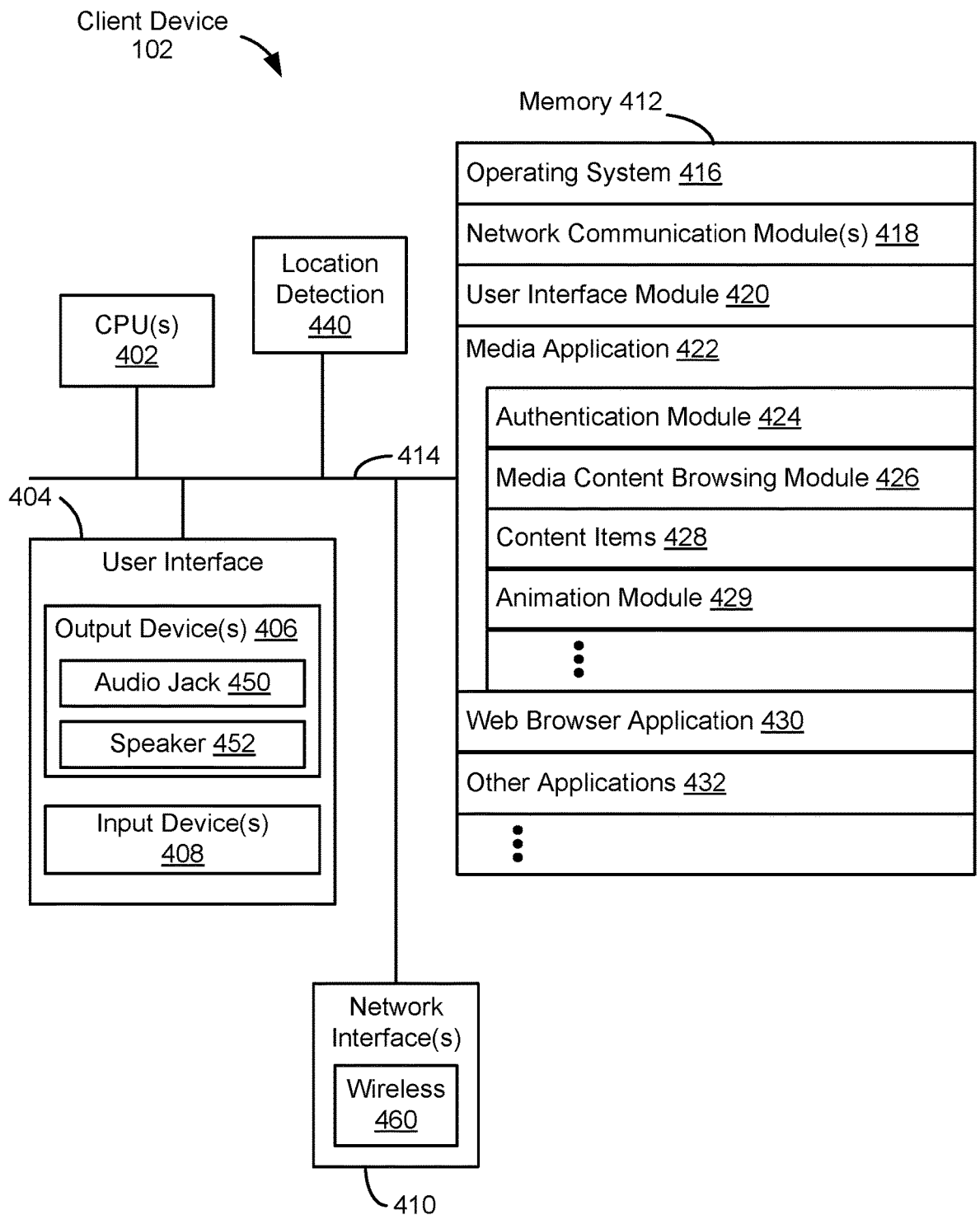
FIG. 4 is a block diagram illustrating a client device in accordance with some embodiments.

FIG. 4 is a block diagram illustrating a client device 102 (e.g., client device 102-1 and/or client device 102-m, FIG. 1) in accordance with some embodiments. The client device 102 includes one or more central processing units (CPU(s), i.e., processors or cores) 402, one or more network (or other communications) interfaces 410, memory 412, and one or more communication buses 414 for interconnecting these components. The communication buses 414 optionally include circuitry (sometimes called a chipset) that interconnects and controls communications between system components.

The client device 102 includes a user interface 404, including output device(s) 406 and input device(s) 408. In some embodiments, the input devices 408 include a keyboard, mouse, or track pad. Alternatively, or in addition, in some embodiments, the user interface 404 includes a display device that includes a touch-sensitive surface, in which case the display device is a touch-sensitive display. "User input," as described herein, may refer to a contact detected with a touch-sensitive display and/or an input by an input device 408. In some embodiments, the output devices (e.g., output device(s) 406) include a speaker 452 (e.g., speakerphone device) and/or an audio jack 450 (or other physical output connection port) for connecting to speakers, earphones, headphones, or other external listening devices. Furthermore, some client devices 102 use a microphone and voice recognition device to supplement or replace the keyboard. Optionally, the client device 102 includes an audio input device (e.g., a microphone) to capture audio (e.g., speech from a user).

Optionally, the client device 102 includes a location-detection device 440, such as a global navigation satellite system (GNSS) (e.g., GPS (global positioning system), GLONASS, Galileo, BeiDou) or other geo-location receiver, and/or location-detection software for determining the location of the client device 102 (e.g., module for finding a position of the client device 102 using trilateration of measured signal strengths for nearby devices).

In some embodiments, the one or more network interfaces 410 include wireless and/or wired interfaces for receiving data from and/or transmitting data to other client devices 102, media presentations systems 108, a media content server 104, and/or other devices or systems. In some embodiments, data communications are carried out using any of a variety of custom or standard wireless protocols (e.g., NFC, RFID, IEEE 802.15.4, Wi-Fi, ZigBee, 6LoW-PAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 410 include a wireless interface 460 for enabling wireless data communications with other client devices 102, media presentations systems 108, and/or or other wireless (e.g., Bluetooth-compatible) devices (e.g., for streaming audio data to the media presentations system 108 of an automobile). Furthermore, in some embodiments, the wireless interface 460 (or a different communications interface of the one or more network interfaces 410) enables data communications with other WLAN-compatible devices (e.g., a media presentations system 108) and/or the media content server 104 (via the one or more network(s) 112, FIG. 1).

In some embodiments, client device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 412 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 412 may optionally include one or more storage devices remotely located from the CPU(s) 402. Memory 412, or alternately, the non-volatile memory solid-state storage devices within memory 412, includes a non-transitory computer-readable storage medium. In some embodiments, memory 412 or the non-transitory computer-readable storage medium of memory 412 stores the following programs, modules, and data structures, or a subset or superset thereof:

- an operating system 416 that includes procedures for handling various basic system services and for performing hardware-dependent tasks;
- network communication module(s) 418 for connecting the client device 102 to other computing devices (e.g., media presentation systems 108, media content server 104, and/or other client devices) via the one or more network interface(s) 410 (wired or wireless) connected to one or more network(s) 112;
- a user interface module 420 that receives commands and/or inputs from a user via the user interface 404 (e.g., from the input devices 408) and provides outputs for playback and/or display on the user interface 404 (e.g., the output devices 406);
- a media application 422 (e.g., an application associated with and for accessing a content (i.e., media-providing) service provided by a media content provider such as media content server 104, including a media player, a streaming media application, or any other appropriate application or component of an application) for browsing, receiving, processing, presenting, and requesting playback of media (e.g., media items). The media application 422 is also used to monitor, store, and/or transmit (e.g., to media content server 104) data associated with user behavior. The media application 422 may include a content-personalization module (e.g., analogous to the content personalization module 524, FIG. 5) and also includes the following modules (or sets of instructions), or a subset or superset thereof:
- an authentication module 424 for sending authentication tokens corresponding to one or more media presentation systems associated with the client device 102 (e.g., one or more of the media presentation systems 108 from FIG. 1), receiving authentication tokens from other devices, and/or generating authentication tokens for media presentation systems associated with client device 102;
- a media content browsing module 426 for providing controls and/or user interfaces enabling a user to navigate, select for playback, and otherwise control or interact with media content, whether the media content is stored or played locally or remotely;
- a content items module 428 for storing media items for playback, including storing a playback queue such as the shared playback queue 103-1; and
- an animation module 429 for generating and/or displaying animations in accordance with various states of the client device;
- a web browser application 430 (e.g., Internet Explorer or Edge by Microsoft, Firefox by Mozilla, Safari by Apple, or Chrome by Google) for accessing, viewing, and interacting with web sites; and
- other applications 432, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

In some embodiments, the media presentation system 108 is a type of client device 102, and includes some or all of the same components, modules, and sub-modules as described above in FIG. 4 with respect to the client device 102.

Figure 5:
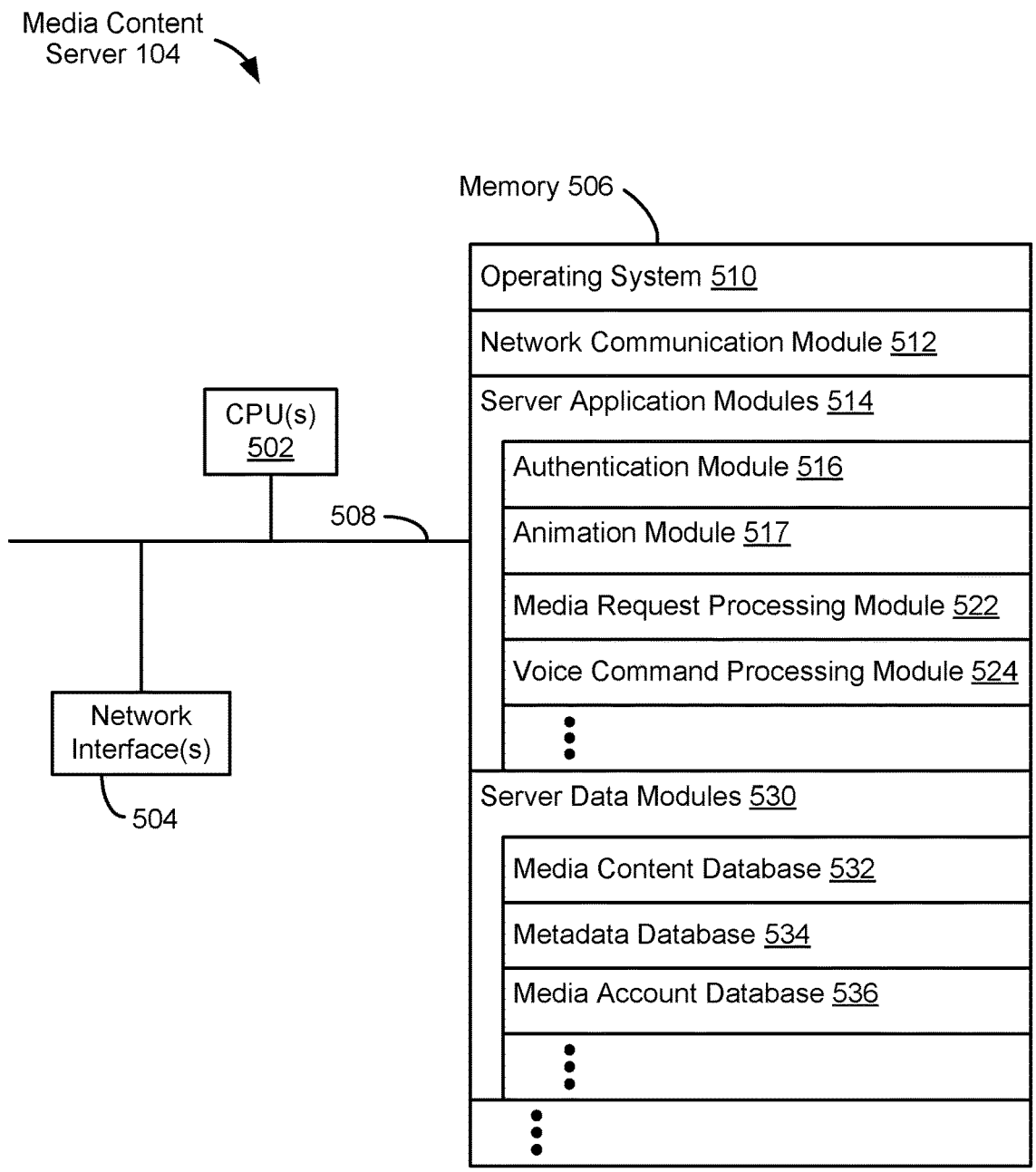
FIG. 5 is a block diagram illustrating a media content server in accordance with some embodiments.

FIG. 5 is a block diagram illustrating a media content server 104 in accordance with some embodiments. The media content server 104 typically includes one or more central processing units/cores (CPUs) 502, one or more network interfaces 504, memory 506, and one or more communication buses 508 for interconnecting these components.

Memory 506 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 506, optionally, includes one or more storage devices remotely located from one or more CPUs 502. Memory 506, or, alternatively, the non-volatile solid-state memory device(s) within memory 506, includes a non-transitory computer-readable storage medium. In some embodiments, memory 506, or the non-transitory computer-readable storage medium of memory 506, stores the following programs, modules and data structures, or a subset or superset thereof:
- an operating system 510 that includes procedures for handling various basic system services and for performing hardware-dependent tasks;
- a network communication module 512 that is used for connecting the media content server 104 to other computing devices via one or more network interfaces 504 (wired or wireless) connected to one or more networks 112;
- one or more server application modules 514 for performing various functions with respect to providing and managing a content service, the server application modules 514 including, but not limited to, one or more of:
  - an authentication module 516 for managing authentication and/or authorization requests;
  - an animation module 517 for generating and/or storing animations to be transmitted to a client device for display;
  - a media request processing module 522 for processing requests for media content and facilitating access to requested media items by client devices (e.g., the client device 102) including, optionally, streaming media content to such devices and/or to one or more media presentation systems 108;
  - a voice command processing module 524 for processing voice commands received by client devices;
- a one or more server data module(s) 530 for handling the storage of and access to media items and metadata relating to the media items; in some embodiments, the one or more server data module(s) 530 include:
  - a media content database 532 for storing media items (e.g., audio files, video files, text files, etc.);
  - a metadata database 534 for storing metadata relating to the media items; and
  - a media account database 536 for storing account information for user media accounts, including user profiles, credentials (e.g., user identifiers, passwords, email addresses, etc.), credentials or identifiers of any linked accounts, and the like.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 412 and 506 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 412 and 506 optionally store a subset or superset of the respective modules and data structures identified above. Furthermore, memory 412 and 506 optionally store additional modules and data structures not described above. In some embodiments, modules stored in memory 412 may also be stored in memory 506 (and vice-versa). For example, the shared playback queue module 529 may be stored at the media content server 104 in memory 506 and/or stored in memory 412 at the client device 102.

Although FIG. 5 illustrates the media content server 104 in accordance with some embodiments, FIG. 5 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement the media content server 104, and how features are allocated among them, will vary from one embodiment to another and, optionally, depends in part on the amount of data traffic that the server system handles during peak usage periods as well as during average usage periods.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
    at an electronic device having one or more processors and memory storing one or more programs for execution by the electronic device:
        displaying a first icon comprising a shape, wherein the first icon includes a plurality of loops, each loop corresponding to a respective user of a plurality of users and each loop in the plurality of loops is independently animated in accordance with a received voice command of the respective user corresponding to the loop;
        while displaying the first icon, receiving a voice command corresponding to a request for media content;
        in response to, and while receiving, the voice command, dynamically animating the first icon, including distorting a length of a radius of only a portion, less than all, of the shape inward such that the length of the distorted radius does not extend beyond the radius of the shape, wherein the dynamic animation indicates that the electronic device is in a f first state; and
        after the voice command is completed, displaying an indication that the device is in a second state that is distinct from the first state.

2. The method of claim 1, wherein a center of the portion of the shape corresponds to a spatial direction from which the voice command is received relative to the electronic device.

3. The method of claim 1, wherein a center of the portion of the shape is substantially opposite a spatial direction from which the voice command is received relative to the electronic device.

4. The method of claim 1, wherein the distortion of the length of the radius of the portion of the shape is symmetric about a center of the portion of the shape.

5. The method of claim 1, wherein distorting the length of the radius of the portion of the shape comprises generating an inward perturbation of the radius of the portion of the shape.

6. The method of claim 1, wherein dynamically animating the first icon further includes:
    superimposing one or more sinusoidal waves on at least part of the portion of the shape.

7. The method of claim 6, wherein the one or more sinusoidal waves comprise a color distinct from a color of the shape.

8. The method of claim 1, wherein distorting the length of the radius of a portion of the shape creates a wave on the portion of the shape, the wave having a maximum amplitude at a center of the portion of the shape.

9. The method of claim 1, wherein distorting the length of the radius of the portion of the shape is in accordance with a volume or frequency of the voice command.

10. The method of claim 1, wherein distorting the length of the radius of the portion of the shape comprises:
    generating a symmetric animation, the symmetric animation including respective ends of the portion that connect with the shape, the respective ends having smaller amplitude than an amplitude at a center of the portion of the shape.

11. The method of claim 1, wherein the indication that the device is in the second state comprises displaying three concentric shapes, each shape having a distinct radius and color.

12. The method of claim 1, wherein the shape is a parametrically-defined shape.

13. The method of claim 1, wherein the shape is a circle.

14. The method of claim 1, wherein dynamically animating the first icon further includes distorting the length of the radius of the portion, less than all, of the shape while maintaining a constant radius of an opposite portion of the shape.

15. An electronic device, comprising:
    one or more processors; and
    memory storing one or more programs for execution by the electronic device for:
        displaying a first icon comprising a shape, wherein the first icon includes a plurality of loops, each loop corresponding to a respective user of a plurality of users and each loop in the plurality of loops is independently animated in accordance with a received voice command of the respective user corresponding to the loop;
        while displaying the first icon, receiving a voice command corresponding to a request for media content;
        in response to, and while receiving, the voice command, dynamically animating the first icon, including distorting a length of a radius of only a portion, less than all, of the shape inward such that the length of the distorted radius does not extend beyond the radius of the shape, wherein the dynamic animation indicates that the electronic device is in a f first state; and
        after the voice command is completed, displaying an indication that the device is in a second state that is distinct from the first state.

16. The electronic device of claim 15, wherein a center of the portion of the shape corresponds to a spatial direction from which the voice command is received relative to the electronic device.

17. The electronic device of claim 15, wherein the distortion of the length of the radius of the portion of the shape is symmetric about a center of the portion of the shape.

18. The electronic device of claim 15, wherein dynamically animating the first icon further includes:
    superimposing one or more sinusoidal waves on at least part of the portion of the shape.

19. The electronic device of claim 15, wherein distorting the length of the radius of a portion of the shape creates a wave on the portion of the shape, the wave having a maximum amplitude at a center of the portion of the shape.

20. The electronic device of claim 15, wherein distorting the length of the radius of the portion of the shape is in accordance with a volume or frequency of the voice command.

21. A non-transitory computer-readable storage medium storing one or more programs for execution by an electronic device, the one or more programs including instructions for:
- displaying a first icon comprising a shape, wherein the first icon includes a plurality of loops, each loop corresponding to a respective user of a plurality of users and each loop in the plurality of loops is independently animated in accordance with a received voice command of the respective user corresponding to the loop;
- while displaying the first icon, receiving a voice command corresponding to a request for media content;
- in response to, and while receiving, the voice command, dynamically animating the first icon, including distorting a length of a radius of only a portion, less than all, of the shape inward such that the length of the distorted radius does not extend beyond the radius of the shape, wherein the dynamic animation indicates that the electronic device is in a f first state; and
- after the voice command is completed, displaying an indication that the device is in a second state that is distinct from the first state.

* * * * *